United States Patent Office 3,331,071
Patented July 11, 1967

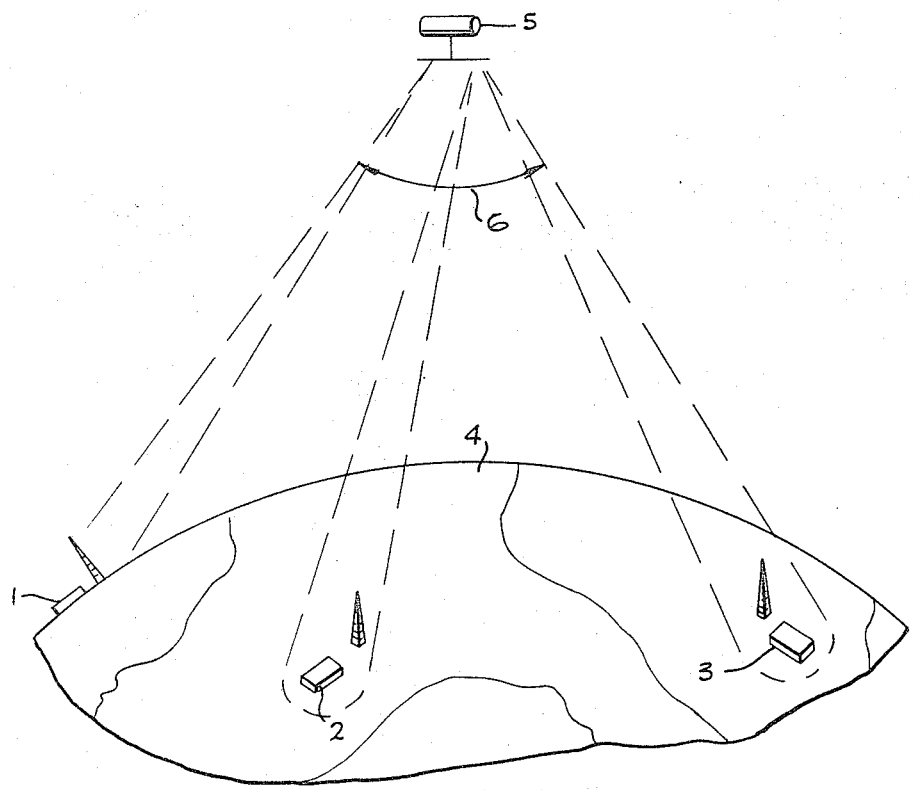

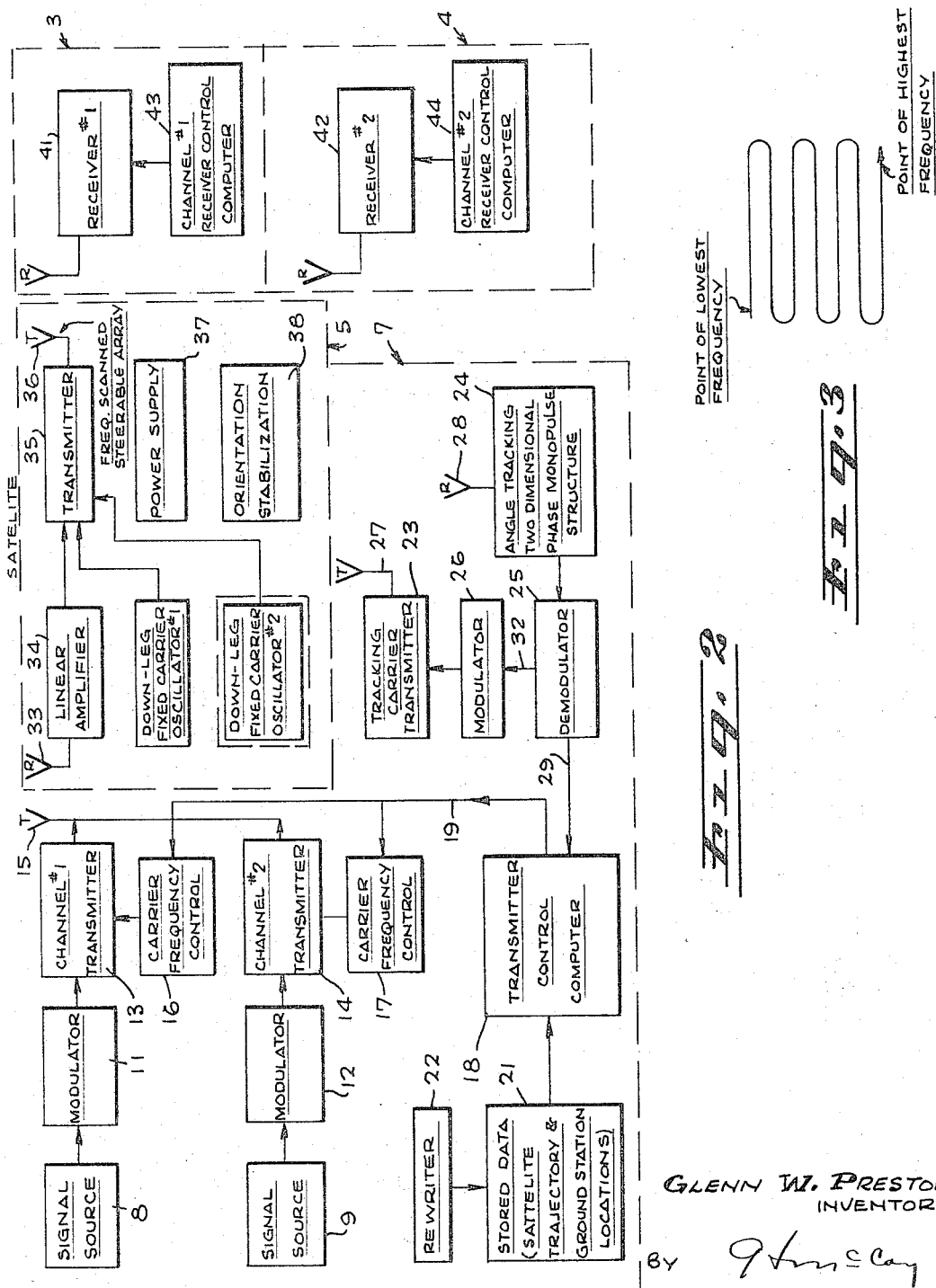

3,331,071
SATELLITE COMMUNICATION SYSTEM
James E. Webb, Administrator of the National Aeronautics and Space Administration, with respect to an invention of Glenn W. Preston, Bala-Cynwyd, Pa.
Filed Dec. 23, 1965, Ser. No. 516,162
12 Claims. (Cl. 343—100)

This invention relates to a communication satellite system and more particularly to a radio communications system wherein an orbiting radio relay satellite is equipped with an antenna which is electronically steerable from the ground in response to a variable-frequency signal, permitting the antenna to continuously direct its output beam to a ground station as the satellite moves along its orbit.

Various systems have been proposed heretofore which employ orbiting satellites as relay stations in the transmission of radio signals from one point to another on the earth. Inasmuch as the satellite is constantly moving relative to the various ground stations on the earth, it has not been feasible, heretofore, to employ highly directionalized antennas in the satellite without also employing active servomechanisms to continuously maintain the desired orientation of the antenna relative to the ground station. The use of highly directional antennas is desired in order to minimize the power requirements of the radio transmission system. However, antenna positioning servomechanisms, as heretofore required for highly directional antennas, are complex, require considerable amounts of operating power, and significantly add to the weight of the satellite. An alternative technique is to employ non-directional antennas; however, this results in a very low efficiency of the radiated energy. The present invention avoids the problems of these alternatives by equipping the satellite with an antenna which is fixedly attached to the main structure of the satellite and the beam pattern of which is electronically steerable in response to signals emanating from the ground. The antenna is similar to certain types of radar antennas used heretofore which can be made to sweep their beam through an angle by varying the frequency of the carrier of the radiated signal. That is, for example, at the lowest frequency the beam may be directed to the left while at the highest frequency the beam is directed towards the right. At an intermediate frequency the antenna beam will be directed along a path midway between the right and left limits.

In use, a ground station having data indicating the instantaneous orbital position of the satellite and the ground location of a desired receiving station, is used to send a selective frequency modulated signal to the satellite to direct the antenna beam directly at the receiving station. The frequency is varied to keep the beam aimed at the ground station as the satellite moves. The principal advantage of such a system is that much less power is required by the satellite since the beam is aimed directly at the receiver. Since no complex mechanical or electromechanical servomechanisms are required there is a significant saving in weight in the satellite and there is no requirement for a power supply to operate such a servomechanism. A further weight reduction results in a reduction in the size of the transmitting apparatus due to the increased efficiency of a beamed transmission as contrasted with a nondirectional transmission.

An overall system typically will comprise a plurality of transmitters, receivers, a satellite relay, and control computers. The transmitters and receivers perform their normal functions in the radio communications system of carrier frequency generation, modulation, and demodulation. In a preferred construction of the invention, the transmitting ground station, will, in addition to the normal functions, have the capability of generating simultaneously two or more carrier frequencies each of which may be changed continuously at the command of a control computer. One of the carriers (which may be operated only intermittently) is used for obtaining satellite position and orientation data. This will be referred to, hereinafter, as the "tracking" carrier. The remaining carriers comprise the information carriers and are modulated by the desired messages to be transmitted to the receiving ground stations.

The frequency of each information carrier is related to the position and orientation of the satellite and the position of the selected receiving ground station. This frequency will change continuously with the satellite's position and orientation. The information carrier frequency is computed by the control computer on the basis of data obtained from the tracking carrier and of the known location of the desired ground station. As the position and orientation of the relay satellite change, the information carrier frequencies are caused to undergo corresponding changes which will generally be much larger than the modulation bandwidth.

The relay satellite itself consists of a receiving antenna (the directivity of which depends upon the degree of vertical stabilization which can be maintained) for receiving signals from any visible point on the earth; a linear amplifier, one or more fixed tuned oscillators for converting to down leg carrier frequencies, a power source, orientation stabilization elements, and a transmitting antenna array which forms a beam, for each carrier, having a direction dependent upon the down leg carrier frequency and the physical properties of the array. In a preferred embodiment the transmitting antenna comprises a linear array or a two-dimensional array which may be approximately oriented and stabilized to align itself either along the earth's gravitational field or at right angle to it.

The practical advantages of the present invention all derive from the use of the frequency scanned transmitting antenna in the satellite since this makes it possible to form a directional beam on the down leg for each receiving station, simultaneously, merely by the proper control of the frequency of the up leg information carrier. To do this mechanically would require a separate tracking antenna in the relay satellite for each ground station. Other known electrical beam scanning methods do not have a multiple access capability. That is, they do not have the ability to form more than one separately directed down-leg beam at any one time. The ability of the present invention to form, simultaneously, a directional, electrically steerable beam for each signal channel greatly reduces the necessary satellite transmitter power and also provides isolation of down-leg signals to different ground stations. The active electrical elements of the present invention are actually less complex and hence, less liable to failure, than other known multiple access repeaters, which usually require special circuitry to reduce the effects of intermodulation distortion.

From the description which follows it will be seen that the invention resides partly in the physical and electrical structure and interrelationships embodied in the satellite's transmitting antenna and the ground station components of the system, as herein specifically illustrated, but also embraces the concept of the system itself, considered as an integrated whole, and independently of the structural details of its several parts.

In the drawings:

FIGURE 1 diagrammatically illustrates the principal components of a typical communications system constructed in accordance with the invention, and which comprises a single transmitting ground station, a relay satellite, and a pair of receiving ground stations.

FIGURE 2 is a block diagram of the system of FIGURE 1.

FIGURE 3 diagrammatically illustrates the scanning pattern of the satellite's transmitting antenna.

Inasmuch as each of the functional units represented by a rectangle in FIGURE 2 may be any one of the numerous devices for each respective function well known in the art, it is deemed unnecessary to show circuit and/or structural details. The description of the invention that follows is deemed to be sufficient to enable those skilled in the art to practice it.

Looking now at FIGURE 1, there is shown a plurality of ground stations 1–3 located at various places on the Earth 4, and a satellite 5 carrying the frequency scanned array apparatus of the invention. For the purpose of illustration, assume that ground station 1 is the transmitting station and ground stations 2 and 3 comprise individual down-leg receiving stations. The transmitting station 1 transmits the information which is to be relayed, to the satellite's receiving antenna on a selected carrier frequency which will determine the beam angle 6 of the re-transmitted signal from the satellite 5.

FIGURE 2 is a block diagram illustrating the various components making up the communications system of FIGURE 1. The transmitting ground station components are enclosed within dotted outline 7 and comprise a plurality of signal sources, which may, for example, be voice inputs, television transmissions, teletype signals, etc. Although only two signal sources 8 and 9 are shown, it should be understood that additional channels may be added as required. The outputs of the signal sources 8 and 9 are supplied to corresponding modulators 11 and 12, respectively, of any suitable and well-known construction capable of modulating the transmitted carrier as a function of the input signals. The radio-frequency carriers which are to be modulated are generated by corresponding ones of transmitters 13 and 14. The modulated radio-frequency outputs from transmitters 13 and 14 are supplied to transmitting antenna 15. In order to selectively control the carrier frequency for each individual transmitting channel, so as to ultimately result in the desired re-transmission beam angle from the satellite, individual carrier-frequency controls 16 and 17 are connected to corresponding ones of the transmitters 13 and 14. Each of these carrier-frequency controls (16 and 17) comprise any suitable and well-known circuit device such as an electron-coupled oscillator (ECO) for varying the output frequency of the associated transmitter. Each of the carrier-frequency controls 16–17 are responsive to the transmitter control computer 18. The output of the transmitter control computer 18 appears on line 19 and may comprise a control voltage for adjusting the carrier frequency controls 16 and 17.

The selected carrier frequencies for each of the two transmitting channels, as ultimately determined by the output of the transmitter control computer 18, is computed from information derived from stored data and from active data relating to the satellite's instantaneous position.

The stored data are recorded in a suitable memory device 21 and comprise given satellite trajectory information as well as the locations of the ground receiving stations. A rewriter 22 permits these stored data to be modified or updated if the orbital path of the satelite 5 is permanently altered and/or if the location of one or more of the ground receiving stations 3 or 4 is changed.

The active data relating to the instantaneous location of the satellite 5 in its permanent orbit is obtained by a closed-loop system comprising tracking carrier transmitter 23, angle tracking receiver 24, demodulator 25, and modulator 26. The tracking carrier transmitter 23 transmist a beam via antenna 27 to the satellite 5 which relays the signal back to receiving antenna 28. The tracking carrier is modulated and deviated in a systematic way to determine that frequency for which maximum power is observed at the ground station 1. The returned tracking carrier signal is picked up by receiving antenna 28 which preferably comprises a two-dimensional phase monopulse antenna structure for accurate angular tracking of the satellite's position. The signal received by this antenna structure 24 is supplied to receiving demodulator 25. The frequency for which the returned signal is strongest corresponds to one component of the satellite's oscillations about the gravitational gradient, as will be discussed more fully hereinafter. As the received signal intensity falls off, the corresponding reduction from the output of demodulator 29 appearing on line 32 will shift the tracking carrier frequency of transmitter 23 in response to modulator 26 which is under the control of the demodulated signal on line 32. Thus, the loop between transmitting antenna 27 and receiving antenna 28 is closed via the satellite 5. The satellite trajectory signal appears on line 29 and comprises the active variable input to the transmitter control computer 18.

The purpose of the tracking carrier is to determine the orientation and position of the satellite 5 at all times in order that the information carriers be given the proper frequency to direct the down-leg beams towards the intended receiving ground stations. If the relay array (retransmitting antenna) in the satellite were at all times perfectly stabilized so that its orientation would be known at all times, the required information carrier frequency could be computed from the relative position of the relay satellite and the receiving ground station. In such a situation, the use of the tracking carrier would be unnecessary. In order to make it possible to operate the system of the present invention with imperfectly stabilized satellite antennas, the tracking carrier is continuously adjusted so that it forms a beam in the satellite transmitting array which is always directed back towards the ground station 7.

In order to facilitate satellite orientation tracking, the tracking carrier is modulated or swept systematically to determine that frequency for which maximum power is observed at the ground station 7. The analysis of the oscillations of the satellite antenna about the vertical axis might be accomplished more rapidly by consolidating the tracking information from several ground sites using the satellite itself for communicating these data. The information bandwidth required for this purpose is minute compared to the signal bandwidth since the satellite oscillations are merely periodic and change very slowly.

The ground station transmitter antenna 27 preferably is provided with phase monopulse circuits for accurate angular tracking of the satellite 5, and the tracking carrier may be modulated in order to also provide precise satellite range data to the control computer 18.

As stated previously, the fixed input to computer 18 together with the variable input appearing on line 29 will generate a computer control signal on line 19 which will continuously adjust the carrier frequencies of the data channel transmitters 13 and 14.

The receiving antenna 33 in the satellite 5 comprises a broadband, directional antenna which is oriented with respect to the satellite to be responsive to the signal transmitted from antenna 15. The degree of directivity of antenna 33 is dependent upon the degree of vertical stabilization which can be maintained by the satellite, but which will in any event receive signals from any visible point on the earth. The broadband signal picked up by this antenna 33 is supplied to linear amplifier 34 where it is amplified and then supplied to the input of relay transmitter 35. The output of transmitter 35 is supplied to the frequency-scanned steerable array antenna 36, which comprises the re-transmitting antenna of the satellite system. The satellite 5 includes a suitable power supply 37 for energizing the receiving amplifier 34 and the re-transmitting transmitter 35 as well as such other electrical subassemblies as may be required.

An orientation stabilization mechanism 38 is also included within the satellite to maintain a given orientation of the re-transmitting antenna 36, as well as receiving antenna 33, with respect to the earth. That is, there is a single optimum relative position of the steerable array 36 with respect to the earth, as the satellite moves through its predetermined orbital path, as required to carry out the intended purpose of the inventon. This does not require, however, that the steerable array be mechanically oriented in order to favorably beam its output to any particular ground receiving station. The reason for this is that steering of the output beam is accomplished by purely electronic means (as opposed to mechanical means) and a plurality of separate output beams may be transmitted at separate angles, concurrently.

The ground receiving stations, as indicated at 3 and 4, may be widely spaced at individual locations on the earth. The degree of separation is limited only by the requirement that they be within line of sight of the satellite and within the sweep capabilities of the scanning antenna 36. As in the previously described portions of the communications system, the components comprising the individual ground receiving stations 3 and 4 may comprise conventional devices such as suitable and well-known radio receivers modified only to the extent that they are provided with means for following changes in the frequency of the received information carrier.

To facilitate an understanding of the orientation stabilization requirements of the satellite portion of the system of the invention, there will be first described the case of a satellite whose oscillations about the vertical axis are those of a simple pendulum (i.e., equal movements of inertia about axes normal to the antenna axis, small oscillations).

Let $\rho$ be the lateral displacement of a unit vector pointing along the antenna axis with its origin at the satellite center of gravity.

Image a plane which is orthogonal to the gravitational vector, and a coordinate system whose origin is the projection of the satellite center of gravity along the vertical. The ground station under consideration lies in the plane of the vertical and the $x$ axis. The orientation of the satellite axis is characterized by the coordinate $x, y$ at which its axis intersects the reference plane.

Under the above assumptions, the motion of each of the coordinate points $x, y$ will be periodic with the same period but generaly different amplitude and phase, $$x = x_m \cos(\omega t + \theta_x)$$
$$y = y_m \cos(\omega t + O_y)$$

Let $\mu$ be the angle subtended at the satellite center of gravity by the vertical and the line of sight to the ground station, then the angle $\beta$ between the line of sight and the antenna axis is approximately $$\beta = \mu - x$$

The relationship betwen carrier frequency and cone angle $\beta$ about the antenna axis of the beam formed by the frequency scanned linear array is $$\frac{n}{f} = \tau - \frac{D}{c} \cos \beta$$

where $n$ is a positive integer (one or two, in practice), D is the physical distance between the array elements, $c$ the velocity of light, and $\tau$ the equivalent time delay between elements. The angle $\mu$ is known from satellite tracking data.

By deviating the tracking carrier in one of several systematic ways, a measurement can be made of the down-leg frequency $f$ for which maximum signal strength is obtained (at the ground station); this corresponds to the cone angle $\beta$ of the satellite beam when it is directed at the ground station. The component of satellite oscillation $x$ and hence $(x_m, O_m, \omega)$ can be determined. Other components of satellite oscillation can be measured concurrently from other ground stations although all components can be measured from any one ground station in the course of time due to the changing relative position of the satellite and ground station.

The invention is not limited to but one construction of antenna 36 inasmuch as there are a number of frequency scanned arrays which are suitable for carrying out the intended function of the invention, as will be apparent to those versed in the art. By way of example, in its simplest form, antenna 36 may comprise a linear array of radiating elements, the successive elements of which are coupled by means of waveguides. These waveguide couplers introduce a time delay between the elements which is somewhat greater than the free space propagation time between them. The array is driven at one end.

The relationship between the direction angle $\beta$ of the conical beam, frequency, and the physical parameters of such an antenna system is $$f = \frac{n}{\tau - \tau_0 \cos \beta}$$

where $n$ may be any positive integer (usually one or two), $\tau$ is the time delay of the couplers, $$\tau_0 = \frac{D}{c}$$

(D is the physical spacing of the array elements, $c$ the velocity of light).

In order that the antenna gain for all of the modulation side bands of the carrier be approximately qeual, it has been shown from theory that the coupler delay $\tau$ must be given by $$\tau = \sqrt{\frac{\tau \tau_0}{GW}} + \tau_0 \cos \beta'$$

where $\beta'$ is a mean angle between zero and the cone angle subtended by the horizon from the satellite, G is the satellite antenna array gain, W is the modulation bandwidth of the information bearing signal.

In addition to the above described waveguide coupled linear array, another suitable embodiment of a frequency scanned array may comprise a rectangular waveguide made in the form of a corkscrew with slots in the peripheral face. The slots are spaced apart at 90 degree intervals with respect to rotation about the screw thus forming four vertical linear arrays. Alternatively, the slots may be spaced at 60 degree intervals to form six vertical linear arrays. In either case the pitch and radius of the slotted corkscrew waveguide structure is such that that propagation time $\tau$ around one loop will be equal to $$\sqrt{\frac{n \tau_0}{GW}} + \tau_0 \cos \beta'$$

where $\tau_0 c$ is the pitch of the screw.

The operation of the above-described system may be summarized as follows:

The transmitter generates a tracking carrier which is modulated and deviated in a systematic way; this is transmitted to the satellite and relayed therefrom. The returned tracking carrier is received through an antenna structure which may be equipped with a two-dimensional phase monopulse structure for accurate angular tracking of the satellite's position. The returned tracking carrier is then demodulated and the frequency for which the returned tracking signal is strongest corresponds to one component of the satellite's oscillations about the gravitational gradient. This measured frequency is used to correct the tracking carrier frequency forming a closed-loop tracking system. The satellite's orbital location can be derived in real time from this closed-loop tracking system.

The transmitter control computer contains stored data on the satellite's trajectory, together with orientation and location data of all the ground receiving stations. The stored satellite trajectory and orientation data must be continually updated on the basis of tracking carrier data. The control computer generates instructions for the initial tracking carrier frequency, the information carrier frequencies (this will generally be different for each of the various ground receiving stations) and possible antenna steering instructions.

Under the control of the transmitter control computer the ground-based transmitters (e.g., transmitters 13 and 14 of FIGURE 2) generate a carrier for each receiving station being addressed (e.g., stations 3 and 4), the frequency of each carrier being altered continuously according to the instructions from the control computer. The output beam of the satellite's re-transmitting antenna may be made to scan a pattern as shown in FIGURE 3 in response to a cyclically changing information carrier frequency. The RF or IF sections of receivers 41 and 42, which are responsive to corresponding ones of the information carries, are dynamically tuned on instructions from their associated control computers 43 and 44, respectively. In this way noise and interference are reduced. This dynamic tuning can be done since the carrier frequency which will direct a beam at the ground receiver can be pre-computed and thereafter updated on the basis of information received via the information carrier.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the inventon be limited only as indicated by the scope of the following claims.

What is claimed is:

1. The method of transmitting a radio signal between first and second spaced-apart stations via an orbiting relay satellite station, comprising the steps of:
   transmitting a signal-modulated carrier from said first station to said satellite station at an initial carrier frequency which is related to the location and orientation of said satellite station with respect to said second station;
   re-transmitting the carrier received at said satellite station from said first station to said second station by means of a directional antenna whose beam angle is a function of the frequency of said carrier; and
   varying said initial frequency of said carrier in response to changes in the orientation and orbital path of said satellite station.

2. The method as defined in claim 1 including the steps of:
   transmitting a tracking carrier from said first station to said satellite station;
   re-transmitting said tracking carrier from said satellite station;
   receiving said re-transmitted tracking carrier at said first station; and
   shifting the frequency of said tracking carrier transmitted from said first station to obtain maximum signal strength of the re-transmitted tracking carrier received at said first station and thereby obtain an indication of the orientation and orbital path of said satellite station.

3. The method as defined in claim 2 including the step of:
   transmitting satellite orientation and orbital path information from said first station to said second station via said satellite station.

4. The method as defined in claim 3 including the step of:
   receiving said re-transmitted signal-modulated carrier at said second station by means of a dynamically-tuned receiver responsive to said orbital path information.

5. The method as defined in claim 3 including the step of:
   vertically stabilizing the orientation of said satellite station with respect to the earth's gravitational field.

6. A radio communications system comprising:
   first and second spaced-apart stations;
   an orbiting relay satellite station;
   transmitting means for radiating a signal modulated carrier from said first station to said satellite station at an initial carrier frequency which is related to an initial location and orientation of said satellite station with respect to said second station;
   a directional antenna, carried by said satellite station, having a beam angle which is a function of the frequency of said signal modulated carrier;
   re-transmitting means carried by said satellite station, for receiving said signal modulated carrier from said transmitting means and re-transmitting said received signal modulated carrier via said directional antenna; and
   means located at said first station for varying said initial frequency of said signal modulated carrier in response to changes in the orientation and orbital path of said satellite station.

7. The system as defined in claim 6 having:
   means located at said first station for transmitting a tracking carrier to said satellite station for re-transmission therefrom;
   a receiver located at said first station for receiving a re-transmitted tracking carrier from said re-transmitting means; and
   means located at said first station to shift the frequency of said tracking carrier to obtain maximum signal strength of the re-transmitted tracking carrier received by said receiver and thereby obtain an indication of the orientation and orbital path of said satellite station.

8. The system as defined in claim 7 including:
   a dynamically tuned receiving means located at said second station, and responsive to changes in the orientation and orbital path of said satellite station, to receive said re-transmitted signal modulated carrier.

9. The system as defined in claim 7 having:
   means located at said satellite station for vertically stabilizing the orientation of said satellite station with respect to the earth's gravitational field.

10. A satellite communication system comprising:
    a first station transmitter for transmitting a signal-modulated carrier;
    control means connected to said first station transmitter for selectively varying the frequency of said carrier;
    a satellite receiver for receiving said carrier;
    a satellite transmitter connected to said satellite receiver for re-transmitting said carrier;
    a frequency-scanned directional antenna connected to said satellite transmitter for radiating said re-transmitted carrier in a direction which varies in accordance with changes in the frequency of said carrier; and
    a second station receiver spaced apart from said first station transmitter for receiving said re-transmitted carrier from said antenna.

11. A satellite communication system as defined in claim 10 wherein said control means comprises:
    a computer for varying said carrier frequency in response to changes in the location and orientation of said antenna with respect to said second station receiver.

12. A satellite communication system as defined in claim 10 including:
   a tracking transmitter for transmitting a tracking carrier from said first station to said satellite receiver; and
   means responsive to the tracking carrier re-transmitted from said satellite transmitter to adjust said carrier frequency and thereby direct the re-transmitted carrier from said antenna to said second station receiver.

References Cited

UNITED STATES PATENTS 3,144,606   8/1964   Adams et al. ---------- 325—4

RODNEY D. BENNETT, *Primary Examiner.*

R. E. BERGER, *Assistant Examiner.*